United States Patent [19]
Whiteside

[11] 3,942,183
[45] Mar. 2, 1976

[54] CAMERA WITH PIVOTING BLADES

[75] Inventor: George D. Whiteside, Lexington, Mass.

[73] Assignee: Polaroid Corporation, Cambridge, Mass.

[22] Filed: July 2, 1974

[21] Appl. No.: 485,128

[52] U.S. Cl. .................. 354/29; 352/141; 354/230; 354/246; 354/247; 354/264
[51] Int. Cl.² .......................................... G03B 9/14
[58] Field of Search ........... 354/229, 230, 246, 247, 354/264, 231, 232, 26, 40, 29, 51; 352/141

[56] References Cited
UNITED STATES PATENTS

| | | | |
|---|---|---|---|
| 3,672,267 | 6/1972 | Harvey et al. | 354/51 |
| 3,750,543 | 8/1973 | Eloranta et al. | 354/29 |
| 3,781,099 | 12/1973 | Williams et al. | 352/141 |

*Primary Examiner*—Richard M. Sheer
*Assistant Examiner*—Russell E. Adams, Jr.
*Attorney, Agent, or Firm*—Edward S. Roman

[57] ABSTRACT

A pivoting exposure control system is provided for a photographic apparatus wherein the exposure control system includes a shutter blade apparatus for respectively blocking and unblocking the passage of light through a light entry exposure opening in a camera housing. The shutter blade mechanism includes two shutter blade elements which are disposed for both pivoting and translational motion about a first fixed pivot point spaced laterally apart from the light entering opening in the camera housing. Rotating means pivotally connect at two spaced-apart locations to the respective shutter blade elements so that the shutter blade elements may be simultaneously rotated about a second pivot point spaced laterally apart from the light entering opening and the first pivot point. In this manner, the shutter blade elements may be simultaneously moved over the light entering exposure opening to define a progressive variation of effective apertures.

13 Claims, 6 Drawing Figures

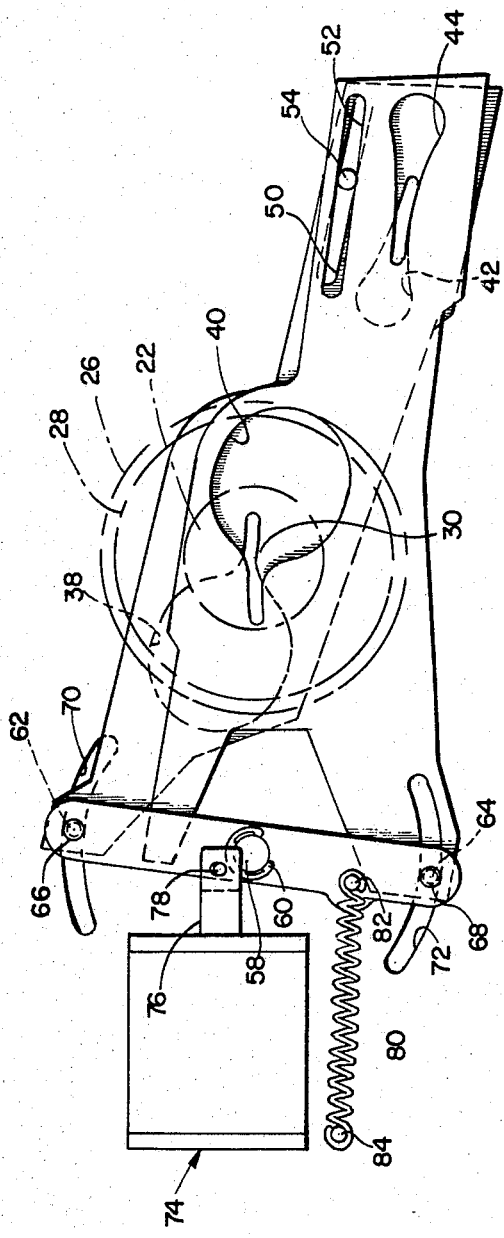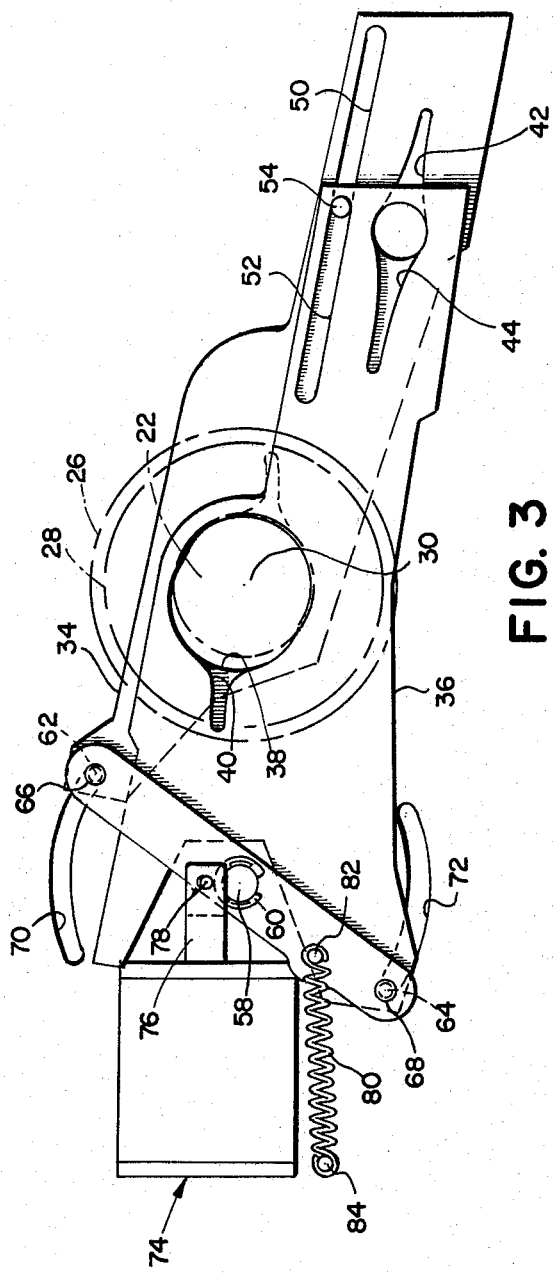

CAMERA WITH PIVOTING BLADES

BACKGROUND OF THE INVENTION

1. Field of the Invention

This invention relates to photography and, more particularly, to a pivoting exposure control system for photographic apparatus.

2. Description of the Prior Art

Thin and compact photographic cameras of the reflex type have been developed wherein the exposure of the film unit is electronically controlled and the film unit may be rapidly processed at a processing station within the photographic camera. A version of such a camera having a compactness and thinness suited to permit convenient carrying in the pocket of a garment is described in a U.S. Patent entitled Reflex Camera by E. H. Land, U.S. Pat. No. 3,672,281. Such cameras are of the single lens reflex variety and require a complex exposure control system in order to accommodate a requisite viewing and focusing mode during which time the single lens reflex camera is in a normally open status to unblock the passage of light through the exposure opening to a viewfinder. At the commencement of an exposure cycle, the shutter mechanism of the camera exposure control system is driven into a closed or light blocking orientation whereupon the photographic camera is automatically operated to change from the viewing and focusing mode to an exposure mode in which photosensitive film is made accessible to the optical path of the taking lens of the camera. When the camera has assumed the exposure mode of operation, the exposure control system operates to release a shutter mechanism from its light blocking orientation wherein such exposure control parameters as exposure interval and aperture size are controlled as a function of scene brightness as evaluated with respect to the sensitometric characteristics of the film being exposed. At the termination of the electronically determined exposure interval, the shutter is again driven to a fully closed or light blocking position to terminate exposure until such time as the camera reassumes the viewing or focusing mode.

The exposure mechanisms for such photographic cameras generally include two cooperately moving shutter blades which ride transversely within supporting tracks. The blades are formed with selectively shaped aperture openings which, depending upon the position of the blades, symmetrically overlap over a light entering exposure opening within the camera housing. Such blades may be connected to define a progression of apertures over the light entering opening in the camera as a result of their connection with a so-called "walking beam" or actuator which is rotatively mounted with respect to the camera housing. Elongate slots are generally formed in the outward tip portions of the beam for the purpose of providing connections with pins extending respectively from the blades. Thus interconnected, the blades will move simultaneously and in correspondence with each other to define a symmetrically configured and variable aperture opening over the camera light entering opening.

Single reflex photographic cameras embodying the above-described exposure control system are suitable for use with film units described in detail in U.S. Patent to E. H. Land, U.S. Pat. No. 3,415,644 entitled Novel Photographic Products and Processes. Such film units include all the materials necessary to produce a positive photographic print by an image forming process which is now well known in the art and involves the formation of transverse image forming substances in an exposed photosensitive element by their diffusion in a manner forming a visual positive image.

Shutter blade mechanisms of the above-described type, although satisfactory for their intended purpose, have proven costly due to the use of supporting tracks which must be precisely dimensioned. In addition, the use of a supporting track to slidably engage a blade element along a substantial portion of the length thereof, may require the use of a high actuating force to overcome the mechanical friction between the blade and track.

Therefore, it is a primary object for this invention to provide a simple and economical exposure control system for a photographic camera which utilizes film units of the type having all materials included therein necessary to produce a positive photographic print.

It is also an object of this invention to provide a simple and economical exposure control system for a photographic camera of the reflex type capable of utilizing film units of the type described in detail in U.S. Pat. No. 3,415,646 supra.

It is a further object of this invention to provide an exposure control system for a photographic camera wherein the exposure control system includes a simple and economical shutter blade mechanism for varying both exposure interval and aperture size.

It is an even further object of this invention to provide an exposure control system for a camera of either the reflex or non-reflex type wherein the exposure control system includes a shutter mechanism which functions in a reliable manner without the use of tracked elements to slidably retain a pair of shutter blades.

It is also an object of this invention to provide an exposure control system for a photographic camera wherein the exposure control system includes a shutter mechanism having low coefficients of friction such that the percentage of the overall actuating force devoted to overcoming mechanical friction is substantially reduced in comparison with conventional systems.

SUMMARY OF THE INVENTION

The present invention relates to a pivoting exposure control system for a photographic apparatus wherein the exposure control system includes a shutter blade apparatus for respectively blocking and unblocking the passage of light through a light entering exposure opening in a camera housing. The shutter blade mechanism may include two shutter blade elements having respective apertures therethrough wherein the apertures may be simultaneously moved over the light entering opening by a rotating means in order to define a progressive variation of effective apertures over the light entering exposure opening. The respective shutter blade elements are both pivotally and translatively disposed about a first fixed pivot point spaced laterally apart from the light entering opening in the camera housing wherein the rotating means includes a walking beam pivotally connected at two spaced apart locations to the respective shutter blade elements. The walking beam in turn is pivotally connected at a point spaced apart from the points of blade and beam pivot to rotate about a second pivot point spaced laterally apart from the light entering exposure opening and the first pivot point. Rotation of the walking beam about the second pivot point operates to simultaneously move the blade elements over the light entering exposure opening thus defining a progressive variation of effective apertures.

The rotating means may additionally include an electromagnetic drive apparatus pivotally connecting to the walking beam at a point spaced apart from the second pivot point so as to be able to selectively rotate the walking beam about the second pivot point. In the preferred mode of operation energization of the electromagnetic drive apparatus operates to move the shutter blade elements into the light blocking mode and bias means are provided for yieldably urging the shutter blade elements into the light unblocking mode. There may also be provided control means for causing selective energization of the electromagnetic drive apparatus wherein the control means include a light detecting and integrating means which receives scene light through a pair of secondary apertures in the respective shutter blade elements. The secondary apertures may be simultaneously moved over the light detecting means in correspondence with the primary apertures to define a progressive variation of effective secondary apertures on the light detecting means such that when an appropriate amount of light is received by the detecting means there is provided a signal by the integrating means to energize the electromagnetic drive apparatus to return the blades to the light blocking position.

In another embodiment, the blades are pivotally connected to the walking beam by respective pin members that are substantially circular in cross-section. The pin members fixedly connect to the walking beam and extend through respective openings of substantially circular cross-section in the shutter blade elements. The pin members from the walking beam preferably extend through the openings in respective shutter blade elements into sliding engagement with respective arcuate tracks or slots which operate to prohibit disengagement of the blade elements from their respective pin members during actuation of the exposure control system.

BRIEF DESCRIPTION OF THE DRAWINGS

The novel features that are considered characteristic of the invention are set forth with particularity in the appended claims. The invention itself, however, both as to its organization and its method of operation together with other objects and advantages thereof will be best understood from the following description of the illustrated embodiment when read in connection with the accompanying drawings wherein:

FIG. 2 is a cross-sectional view of the exposure control system of FIG. 1 diagrammatically depicting the exposure control system in another instant of time during camera operation.

FIG. 3 is a cross-sectional view of the exposure control system of FIG. 1 diagrammatically depicting the exposure control system at still another instant in time during camera operation.

DESCRIPTION OF THE PREFERRED EMBODIMENT

Figure 1:
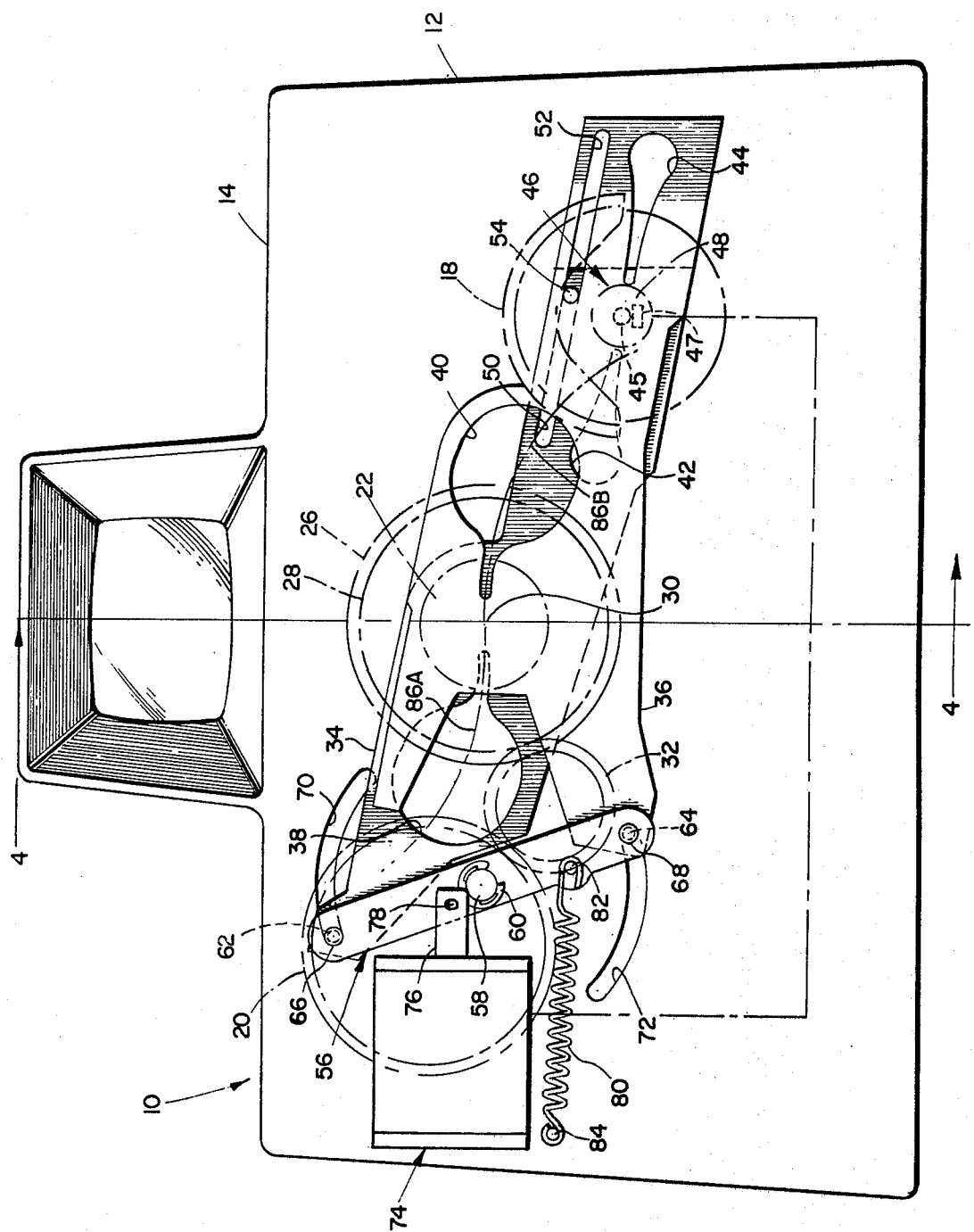
FIG. 1 is a cross-sectional view diagrammatically depicting a photographic camera housing incorporating the pivoting exposure control system of this invention as shown at one instant of time during operation.
Figure 4:
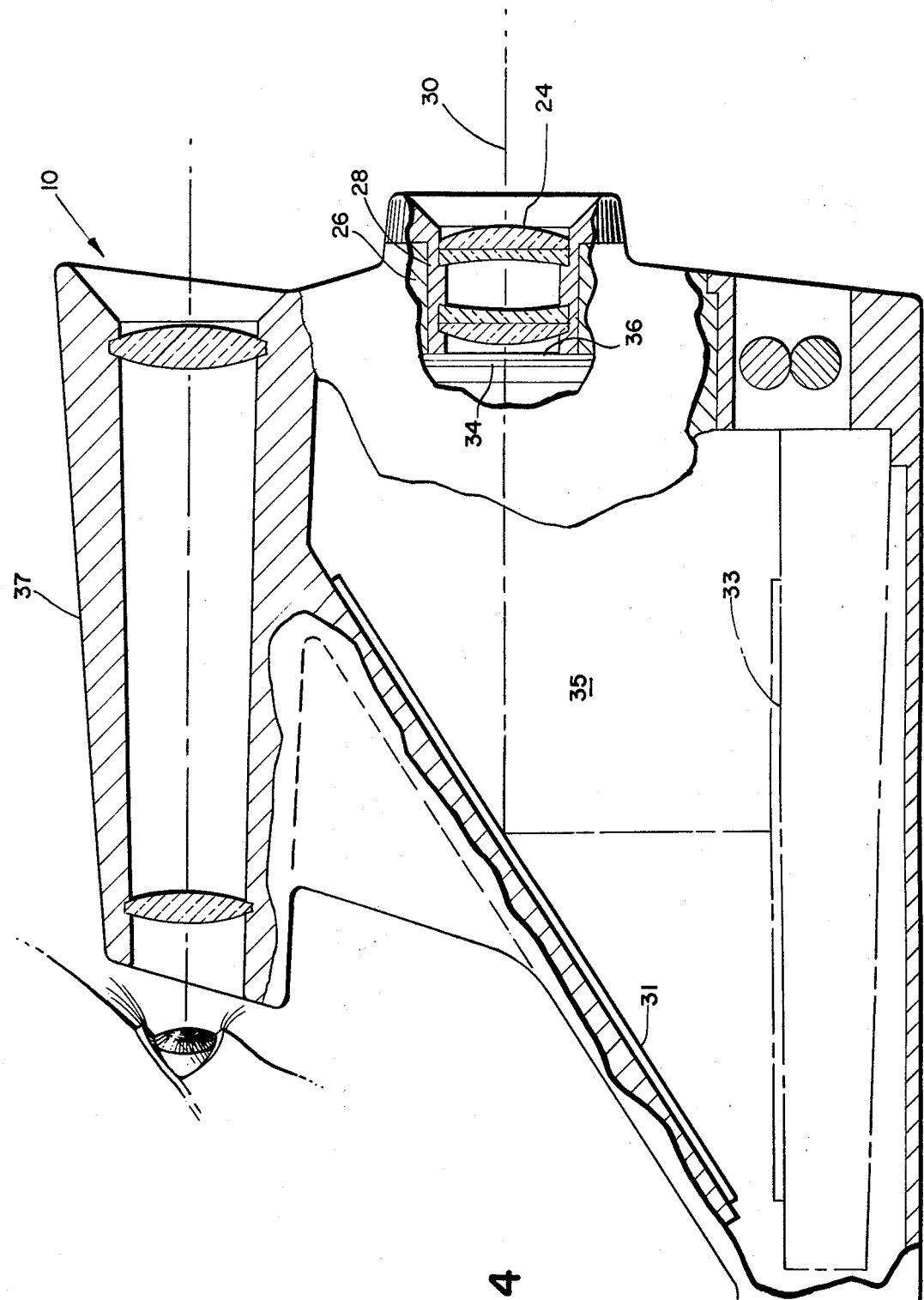
FIG. 4 is a cross-sectional view across the lines 4—4 of FIG. 1.

Referring now to FIG. 1, it can be seen that the pivoting exposure control system is disposed within a housing 10 which comprises a rear casting 12, selectively machined to support the components of the mechanism. Surrounding the front and top of the casting 12, there may be provided a cover 14, which includes openings (not shown), through which protrude manually adjustable trim and focus wheels partially shown in phantom at 18 and 20 respectively. Centrally disposed within the back wall of casting 12 is light entering exposure opening 22, which defines the maximum available exposure aperture for the system.

An objective or taking lens 24 is provided in overlying relation to the light entering opening 22, wherein the objective lens 24 may comprise a plurality of elements retained in predetermined spaced relation by a cylindrical lens mount 28, which is externally threaded for toothed engagement within an internally threaded bezel 26. Bezel 26 is made rotatable with respect to the housing 10 to provide translational movement of the elements of lens 24 along the center axis 30 of the optical path of the housing 10. As is readily apparent the center axis 30 of the optical path is illustrated in FIGS. 1–3 as being normal to the plane of the drawing. The rotation of bezel 26 may be carried out by manual rotation of the focus wheel 20 which is externally threaded to drive the externally exposed teeth of bezel 26 through an idler gear 32. Rotation of the focus wheel 20 provides displacement of the elements of objective lens 24 for focusing of image carrying rays through the light entering exposure opening 22 to a rearwardly positioned film plane 33 by way of reflecting mirror 31 when the system of FIG. 1 is employed in conjunction with a suitable film exposure chamber 35. Immediately behind the objective lens 24 and light entering exposure opening 22 there are supported two overlapping shutter blade elements 34, 36 which will be subsequently described in greater detail herein. Extending from one side of the housing 12 is a shutter release button (not shown), the depression of which causes the commencement of an exposure cycle.

A pair of scene light admitting primary apertures 38 and 40 are provided respectively in the blade elements 34 and 36 to collectively define a progressive variation of effective aperture openings in accordance with longitudinal and lateral displacement of one blade element with respect to the other blade element. The apertures 38 and 40 are selectively shaped so as to overlap over the light entering exposure opening 22 thereby defining a gradually varying effective aperture size as a function of the position of blades 34 and 36. Each of the blades, 34 and 36 may additionally be configured to have corresponding photocell sweep secondary apertures shown respectively at 42 and 44. Secondary apertures 42 and 44 may be configured in correspondence with the shapes of scene light admitting primary apertures 38 and 40. As is readily apparent, the secondary apertures 42 and 44 also move in correspondence with the primary apertures 38 and 40 to define a small secondary effective aperture for admitting the passage of light from the scene being photographed to a light detecting station shown generally at 46. The light detecting station 46 includes a photoelectric or light integrating unit 48 having both a photocell 45 and control circuit 47 which collectively operate to terminate an exposure interval as a function of the amount of light received through the secondary effective aperture, as defined by the overlapping photocell sweep apertures 42, 44, in a manner to be subsequently described in greater detail. An exposure control mechanism embodying the above-described light detecting station is described in more detail and claimed in a U.S. Patent entitled Exposure Control System by V. K. Eloranta, U.S. Pat. No. 3,641,889.

Projecting from the rear casting 12 at a location spaced laterally apart from the light entering exposure opening 22 is a pivot pin or stud 54 which pivotally and translatively engages elongate slots 50 and 52 formed in shutter blade elements 34 and 36 respectively. Pin 54 may be integrally formed to the rear casting 12 and blade elements 34, 36 may be retained in engaging relation with respect to pin 54 by any suitable means such as peening over the outside end of pin 54.

The opposite ends of the blade elements 34 and 36 respectively include extended portions which pivotally connect to a walking beam 56. The walking beam 56 in turn is disposed for rotation relative to the housing 10 by pivotal connection to a projecting pivot pin or stud 58 which may also be integrally formed to the rear casting 12 at a location spaced laterally apart from the light entering exposure opening 22. The walking beam 56 may be pivotally retained relative to the pin 58 by conventional means such as an E ring 60. In the preferred mode, the walking beam 56 is pivotally connected at its distal ends to the shutter blade elements 34 and 36 by respective pin members 66 and 68 which extend from the walking beam 56. Pin members 66 and 68 are preferably circular in cross-section and extend through respective circular openings 62 and 64 in respective blade elements 34 and 36 so as to slidably engage respective arcuate slots or tracks 70 and 72 which may be integrally formed with the rear casting 12. The arcuate tracks 70 and 72 operate to prohibit disengagement of the blades 34 and 36 from their respective pin members 66 and 68 during exposure control system operation.

A tractive electromagnetic device in the form of a solenoid 74 is employed to displace the shutter blades 34, 36 with respect to each other and the casting 12. The solenoid 74 is of conventional design having an internally disposed cylindrical plunger unit 76 which retracts inwardly into the body of the solenoid upon energization thereof. The solenoid plunger 76 is affixed to the walking beam 56 by means of a pivot pin or stud 78 such that longitudinal displacement of the plunger 76 will operate to rotate the walking beam around the pivot pin 58 so as to appropriately displace the shutter blades 34 and 36.

Housing 10 supports the solenoid 74 in a position just above a biasing tension spring 80 which operates to continuously urge the blades 34 and 36 into positions defining their largest effective aperture over the light entry exposure opening 22. The movable end of spring 80 is attached to beam 56 at a pin 82 while its stationary end is affixed to a pin 84 extending from the casting 12. With the spring connection herein described the exposure control system of this invention is biased into a normally open orientation. In the present arrangement, the shutter blades 34, 36 are drawn to their closed position as shown in FIG. 1 only while the solenoid 74 is energized. Consequently, energization of the solenoid 74 prevents the shutter blades 34, 36 from moving toward their maximum aperture opening under the urging of spring 80. However, as should be readily understood, the exposure control system of this invention would be equally applicable to photographic systems where the blades 34, 36 are spring biased in a normally closed position.

The exposure control system has been herein described in relation to a photographic camera of the non-reflex type although the intended scope of the invention is by no means so limited and cameras of the well-known reflex type as described in U.S. Pat. No. 3,672,281 entitled Reflex Camera by E. H. Land, may be equally suitable for embodying the exposure control system of this invention.

The following photographic cycle of operation will be described in regard to a camera of the non-reflex type wherein the viewfinder 37 does not have a through-the-lens viewing capability. Such a photographic cycle may be commenced with a depression of a start button (not shown). Tension spring 80 thereafter operates to rotate walking beam 56 in a clockwise direction thus moving shutter blade elements 34 and 36 in directions which operate to progressively enlarge the effective aperture over the light entering exposure opening 22. As will be readily appreciated, rotation of walking beam 56 about pivot point 58 effects simultaneous linear and angular displacement of shutter blade elements 34, 36 about pivot pin 54.

By following the progressive rotation of walking beam 56 from the fully closed terminal position of FIG. 1 to the fully open terminal position of FIG. 3, it can be seen that the optical center axis 30 traces curvilinear paths of travel 86A and 86B on respective shutter blade elements 34 and 36. The apertures 38 and 40 are configured about the respective curvilinear paths of travel 86A and 86B to provide a gradually increasing effective aperture between the fully closed terminal position of FIG. 1 and the fully open terminal position of FIG. 3. It is not necessary that the aperture openings 38 and 40 overlap in a manner so as to define a symmetrical effective aperture as is suggested by the conventional tracked shutter blades described in U.S. Pat. No. 3,641,889 by V. K. Eloranta entitled Exposure Control System. The effective aperture may in fact be continuously asymmetrical about the optical center axis 30 with the sole criteria being that the actual area of the effective aperture change in a preselected manner in accordance with the positions of the walking beam and shutter blades. In the preferred mode, the aperture openings 38 and 40 are configured in a symmetrical manner about their respective curvilinear paths of travel 86A and 86B such that any line drawn normal to one of the curvilinear paths will intersect the edges of a respective aperture opening at points spaced equidistant from the curvilinear path. Although in the preferred mode of operation the effective aperture would progressively increase from the closed terminal position of FIG. 1 to the open terminal position of FIG. 3, it is not necessary that the scene light admitting apertures 38 and 40 be so configured and may instead by shaped to provide intermediate periods of either non-changing effective aperture size or decreasing effective aperture size.

Simultaneously the secondary photocell sweep openings 42 and 44 define a corresponding progressively enlarging secondary effective aperture opening over the light detecting station 46. When an appropriate amount of light is received by the photocell of the light detecting station 46, the control circuit is triggered to energize solenoid 74 thus effecting a retraction of plunger 76 together with a counter clockwise rotation of walking beam 56 against the bias of spring 80 to block the optical path of the camera. The exposure interval is thus terminated with the shutter blade elements 34 and 36 returning to the fully closed terminal position of FIG. 1. In this manner, the size of the effective aperture as well as the exposure interval are selectively weighted for any given level of scene brightness in order to optimize the quality of a resultant photograph.

As will be readily appreciated, the actuation system for the shutter blade elements 34 and 36 must be sufficient to overcome the slight inertia of the blade elements as well as the mechanical friction between the moving components of the exposure control system. Ideally the system components are designed to minimize the frictional forces, so that mechanical friction becomes as small a part of the total actuating force as possible. The coefficient of friction between the moving components, however, may not remain static and can increase with time due to dirt, corrosion, or other contaminates lodging between the moving surfaces thereof. The pivoting exposure control system of this invention has been designed to reduce that portion of the total actuating force required to overcome mechanical friction so that even if the coefficient of friction increases slightly with time, mechanical friction will still comprise a relatively small percentage of the total force required to actuate the shutter blades. In this manner, the risk of the shutter blades "hanging up" due to increases in the coefficient of friction with time becomes substantially reduced.

In one embodiment of the pivoting exposure control system herein described, the pins 66 and 68 may be integrally molded with the walking beam 56. By fixedly connecting the pins 66 and 68 directly to the walking beam 56 there is minimized the risk of breakage, to the shutter blade elements for the following reasons. Shutter blade elements 34 and 36 are generally made as thin as possible in order to reduce both weight and mechanical friction wherein typical shutter blade materials may include Mylar in the order of 1/3000 of an inch thick. Such shutter blade structures are relatively inflexible and cannot be repetively flexed to any great extent without substantial risk of fracture. By fixedly connecting the pins 66 and 68 to the walking beam, it is assured that only the edge surfaces of the shutter blade elements are engaged by the pins thus minimizing the risk of any force being applied normal to the plane of the shutter blades since the pins are free to slide relative to the blade surfaces. In this manner, the pins 66 and 68 may shift slightly with respect to the plane of the shutter blades without adversely flexing the shutter blades.

As is readily apparent, the above-described exposure control system eliminates the need for precisely dimensioned track elements to slidably retain the respective blade elements. Therefore, the overall complexity of the shutter mechanism can be substantially reduced with a corresponding reduction in the required cost. It will be further appreciated that a straight line intersecting the pivot pins 54 and 58 does not necessarily have to intersect the optical axis 30. In this manner, a great deal of latitude is provided as to where the pivot pins 54, 58 may be located with respect to the opening 22. The longitudinal edges of the blade elements 34, 36 may also be arranged in skewed relation relative to the longitudinal edges of the casting 12 as shown in the drawing, thus accommodating the inclusion of other components (not shown) within areas of the housing that might otherwise be blocked by conventional blade mechanisms.

Figure 5:
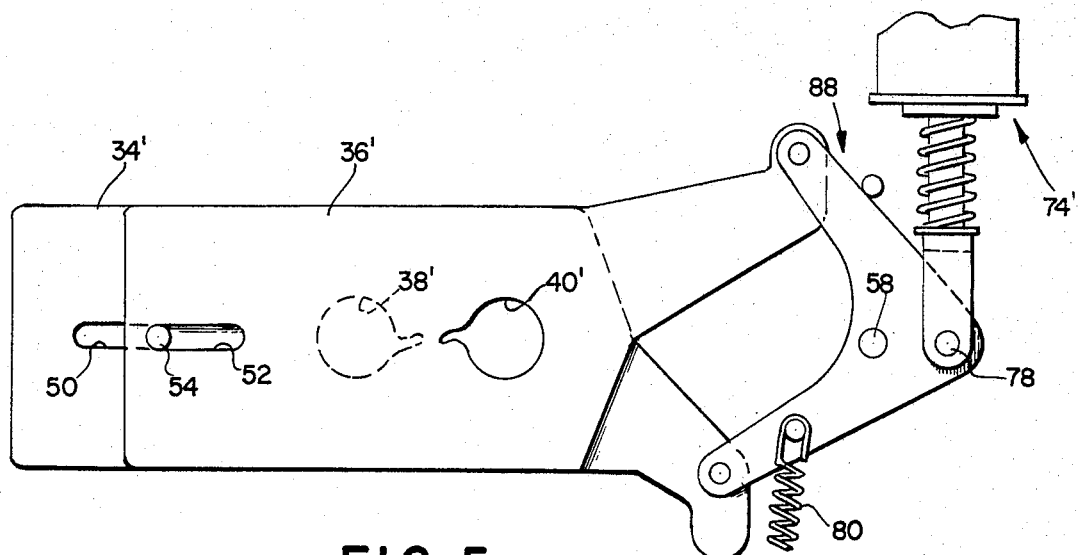
FIG. 5 is a cross-sectional view diagrammatically depicting an alternate embodiment of the exposure control system of FIG. 1.

Referring now to FIG. 5 where like numerals designate previously described elements, there is shown an alternate embodiment for the pivoting exposure control system of this invention including a triangularly configured walking beam 88. As is readily apparent, lines intersecting the points of blade and beam pivot together with the point of plunger and beam pivot at 78 define a triangle wherein the pivot pin 58 is located inside the triangle. In this manner, the longitudinal axis of the solenoid 74' and spring 80 may be aligned normal to the blade longitudinal axis in order to facillitate a dimensional reconstruction of the housing 10 whereby the length of the housing 10 can be decreased.

Figure 6:
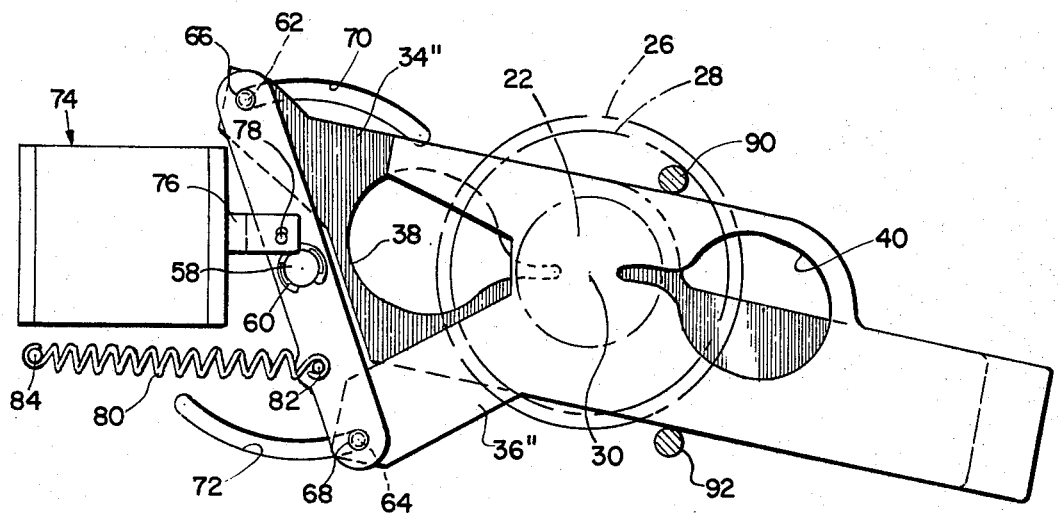
FIG. 6 is a cross-sectional view diagrammatically depicting still another embodiment of the exposure control system of FIG. 1.

Referring now to FIG. 6 where like numerals again designate previously described elements, there is shown still another embodiment for the pivoting exposure control system of this invention. The shutter blade elements 34 and 36 are retained for simultaneous pivotal and translational motion relative to the housing 12 by spaced apart rollers or pins 90, 92 which may be formed integral to the rear casting 12. The pins 90, 92 may be either grooved or peened over at the outside ends thereof in order to retain the blade elements for simultaneous sliding and pivotal motion.

This invention may be practiced or embodied in still other ways without departing from the spirit or central character thereof. The embodiments herein described are therefore illustrative and not restrictive, the scope of the invention being indicated by the appended claims in all variations which come within the meaning of the claims are intended to be embraced therein.

What is claimed is:

1. A pivoting exposure control system for photographic apparatus comprising:
    means defining a light entering exposure opening having an optical axis therethrough;
    at least one blade element having an aperture therethrough disposed about a curvilinear centerline for respectively blocking and unblocking the passage of light through said light entering exposure opening;
    means for mounting said blade element in a manner whereby both linear and angular displacement of said blade element with respect to a first reference point spaced laterally apart from said light entering opening can be accommodate; and
    means for selectively rotating at least one point on said shutter blade element about a second fixed reference point spaced laterally apart from said light entering exposure opening and first reference point so as to cause said shutter blade element to pivot with respect to said first reference point while simultaneously moving linearly across said first reference point in a manner whereby the curvilinear centerline continuously intersects said optical axis.

2. The exposure control system of claim 1 including two blade elements having respective apertures therethrough disposed about respective curvilinear centerlines wherein said apertures may be simultaneously moved over said light entering opening by the rotating means to define a progressive variation of effective apertures over said light entering exposure opening in a manner whereby respective curvilinear centerlines of the blade apertures continuously intersect the optical axis.

3. The exposure control system of claim 1 including two overlapping blade elements having respective primary apertures therethrough disposed about respective curvilinear centerlines wherein the blades are disposed in a manner whereby both linear and angular displacement of each blade member with respect to said first reference point, can be accommodated and said rotating means includes a rigid beam means pivotally connected at two spaced apart locations to respective blade elements wherein the beam means is pivotally connected at a point spaced apart from said points of blade and beam pivot to rotate about the second reference point such that rotation of the beam means about the second reference point operates to cause each shutter blade element to pivot with respect to said second reference point while simultaneously moving linearly across said first reference point thereby moving the blade apertures over the light entering opening to define a progressive variation of effective apertures in a manner whereby the optical axis continuously intersects a respective curvilinear centerline of the blade apertures.

4. The exposure control system of claim 3 wherein said rotating means includes: an electromagnetic drive means pivotally connecting to said beam means at a point spaced apart from said second reference point so as to selectively rotate said beam means about said second reference point whereby energization of said electromagnetic drive means operates to move said blade elements into the light blocking mode;
bias means for yieldably urging the blade elements into the light unblocking mode; and
control means for causing selective energization of said electromagnetic drive means.

5. The exposure control system of claim 4 wherein the control means for causing said selective energization includes a light-detecting and integrating means, and said blade elements additionally include secondary apertues therethrough which may be simultaneously moved over said light-detecting means in correspondence with said primary apertures to define a progressive variation of effective secondary apertures on said lightdetecting means such that when an appropriate amount of light is received by the detecting means there is provided a signal by the integrating means to energize the electromagnetic drive means to return the blade elements to the light-blocking position.

6. The exposure control system of claim 3 including a pair of spaced apart pin members of substantially circular cross-section which fixedly connect to the beam means, and an opening of substantially circular cross-section in each blade element for receipt of a respective pin member.

7. The exposure control system of claim 6 including a pair of arcuate tracks wherein the pin members from the beam means extend through the openings in respective blades into sliding engagement with said respective arcuate tracks which operate to prohibit disengagement of the blade elements from their respective pin members during exposure control system operation.

8. The exposure control system of claim 2 in which said apertures are configured respectively in a symmetrical manner about said curvilinear centerlines such that any line drawn normal to one of the curvilinear centerlines will intersect the edges of a respective aperture opening at points spaced equidistant from said curvilinear centerlines.

9. The exposure control system of claim 2 including a pin having a center axis coincident with said first reference point wherein:
said blade elements include respective elongated slots for engaging said pin, in a manner accommodating both linear and angular displacement of said blade elements with respect to said pin; and wherein said rotating means includes a rigid beam pivotally connected at two spaced-apart locations to respective blade elements; said rigid beam also being pivotally connected with respect to said second reference point at a location along the beam spaced apart from said points of blade and beam pivot such that rotation of the beam about the second reference point operates to simultaneously move said blade elements between said closed and open terminal positions through respective curvilinear paths of travel coincident to said curvilinear centerlines to define a progressive variation of effective apertures on said light entering exposure opening.

10. The exposure control system of claim 9 including an electromagnetic drive means pivotally connection to said beam at a point spaced apart from said second reference point so as to selectively rotate said beam means about said second reference point whereby energization of said electromagnetic drive means operates to move said blade elements into the light blocking mode;
bias means for yieldably urging the blade elements into the light unblocking mode; and
control means for causing said selective energization including a light-detecting and integrating means wherein said blade elements include respective primary apertures therethrough disposed about respective curvilinear centerlines wherein the primary apertures may be simultaneously moved over said light entry exposure opening to define a progressive variation of effective apertures on said light entering exposure opening in a manner whereby the optical axis continuously intersects a respective curvilinear centerline of said primary apertures together with respective secondary apertures therethrough which may be simultaneously moved over said light-detecting means in correspondence with said primary apertures to define a progressive variation of effective secondary apertures over said light-detecting means such that when an appropriate amount of light is received by the deetecting means there is provided a single by the integrating means to energize the electromagnetic drive means to return the blades to the light-blocking position.

11. The exposure control system of claim 10 including: a pair of spaced apart pin members of substantially circular cross-section which fixedly connect to the beam means, and an opening of substantially circular cross section in each blade element for receipt of a respective pin member and a pair of arcuate tracks which remain in fixed relation relative to said housing while slidably engaging respective pin members to prohibit disengagement of the blades from their respective pin members during exposure control system operation.

12. A blade element for use in an exposure control system for photographic apparatus of the type having a light entering exposure opening wherein the element has means for accommodating simultaneous linear and angular displacement through a curvilinear path between positions blocking and unblocking the passage of light through said light entering exposure opening, said element comprising: a blade having an aperture therethrough wherein said aperture is configured in a symmetrical manner about said curvilinear path of travel such that any line drawn normal to the curvilinear path will intersect the edges of a respective aperture opening at points spaced equidistant from said curvilinear path.

13. A pivoting exposure control system for photographic apparatus comprising:

housing means defining a light entering exposure opening having an optical axis therethrough;

two overlapping blade elements having respective apertures therethrough disposed about respective curvilinear centerlines for respectively blocking and unblocking the passage of light through said light entering exposure opening;

means for mounting said blade elements for simultaneous linear and angular motion with respect to said housing; and means for selectively moving said blade elements through said simultaneous sliding and pivoting motion between the light blocking and unblocking positions in a manner whereby said curvilinear centerline of one of the blade apertures is maintained in continuous intersection with said optical axis.

* * * * *